United States Patent [19]

Suzuki et al.

[11] Patent Number: 5,137,784
[45] Date of Patent: Aug. 11, 1992

[54] MAGNETIC RECORD MEDIUM WITH A MAGNETIC LAYER COATED WITH SUCCESSIVE LAYERS OF CARBON, ORGANIC AMINE, AND FLUORO LUBRICANT

[75] Inventors: Takashi Suzuki, Takatsuki; Yoshiaki Kai, Neyagawa; Mikio Murai, Hirakata; Kiyoshi Takahashi, Ibaraki; Takatoshi Minoda; Hidetoshi Matsumoto, both of Kumamoto, all of Japan

[73] Assignee: Matsushita Electric Industrial Co., Ltd., Osaka, Japan

[21] Appl. No.: 490,418

[22] Filed: Mar. 8, 1990

[30] Foreign Application Priority Data

Apr. 6, 1989 [JP] Japan .................... 1-087616

[51] Int. Cl.$^5$ ............................. G11B 5/00
[52] U.S. Cl. .................. 428/408; 428/694; 428/695; 428/900
[58] Field of Search ............ 428/694, 695, 900, 408

[56] References Cited

U.S. PATENT DOCUMENTS

| | | | |
|---|---|---|---|
| 4,696,845 | 9/1987 | Yanagisawa | 428/64 |
| 4,828,924 | 5/1989 | Shojii et al. | 428/422 |
| 4,849,305 | 7/1989 | Yanagisawa | 428/695 |
| 4,889,767 | 12/1989 | Yokoyama et al. | 428/336 |

FOREIGN PATENT DOCUMENTS 63-078316  8/1988  Japan .

Primary Examiner—Paul J. Thibodeau
Assistant Examiner—Steven A. Resan
Attorney, Agent, or Firm—Stevens, Davis, Miller & Mosher

[57] ABSTRACT

A magnetic record medium comprises
(A) a nonmagnetic substrate,
(B) a layer consisting essentially of a ferromagnetic metal on at least one side of the substrate,
(C) a layer containing carbon on the layer of (B),
(D) a layer comprising a primary or secondary organic amine containing at least one substituent having a fluorinated hydrocarbon group at the end of the substituent on the layer of (C), and
(E) a layer comprising at least one lubricant having a plurality or fully fluorinated hydrocarbon group on one end of the molecule and a functional group selected from the group consisting of —OH, —SH, —COOH, —COSH and —CONH$_2$ on the other end of the molecule on the layer of (D).

The magnetic record medium of the present invention has a good endurance reliability and does not cause deterioration of such performances as the CSS durability, head adsorption and still life at high temperatures and high humidities, even when the surface property is improved considerably by decreasing the height of surface protrusions for the purpose of improving the recording density.

3 Claims, 1 Drawing Sheet

MAGNETIC RECORD MEDIUM WITH A MAGNETIC LAYER COATED WITH SUCCESSIVE LAYERS OF CARBON, ORGANIC AMINE, AND FLUORO LUBRICANT

BACKGROUND OF THE INVENTION

The present invention relates to a metal thin layer type magnetic record medium suited for high density recording in magnetic disks, magnetic tapes, etc. used in the storage unit of electronic computers, video tape recorders, etc.

Ferromagnetic metal thin layer type magnetic record media obtained by forming a thin layer of a ferromagnetic metal (including cobalt, nickel, iron or an alloy comprising said metals as the main components) on a substrate formed of a polymer film (such as polyester film and polyimide film, aluminum alloy sheet, glass sheet etc.) by a vacuum film-forming method (such as vacuum deposition, sputtering, ion plating, etc.) exhibits a drastically improved recording density as compared with conventional coat-type magnetic record media. However, they are required to have a very thin magnetic layer and a smooth surface. Therefore, a different technique from that needed in coat-type media is necessary to satisfy these requirements with keeping the endurance reliability of the media.

In magnetic disk units used for external storage units of electronic computers, the so-called contact-start-stop (CSS) system is usually used. In the system, a magnetic head is contrived to float at a distance from the surface of a magnetic disc when the disk is in operation and contact with the surface of the disk during the time of stoppage. In order to endure the contact-sliding repetition of the magnetic head slider with the disc surface, the disc usually has an irregular-shaped surface formed by texture-finishing of the substrate surface, a carbon protective layer comprising graphite as the main component provided on the ferromagnetic metal thin layer and a lubricant layer formed on the surface of the carbon protective layer. As to the lubricant, the use of perfluoropolyethers unmodified or modified at the molecular terminal has been proposed (for example, U.S. Pat. No. 3,778,308 and JP-A-60-109028).

It has been proposed a metal thin layer type magnetic tape provided with a protective layer comprising diamond-like carbon on the ferromagnetic metal thin layer and coating thereon a specific fluoro-lubricant as the means for improving durability (JP-A-62-219314).

As to a magnetic disk, it is necessary to decrease the floating distance of the magnetic head for improving the recording density. In this case, improving the smoothness of the surface by decreasing the height of protrusions formed by texture-finishing leads to poor CSS durability. Additionally it gives rise to the so-called adsorption phenomenon. The adsorption phenomenon refers to a phenomenon wherein the lubricant on the disk surface gathers between the magnetic head and the disk at the time of stoppage of disk unit whereby the magnetic head is sticked to the disk surface.

The desired properties of the lubricant in the lubricant layer on the disk surface is such that the lubricant layer adheres strongly to both the protective layer surface beneath it and the magnetic head surface so as to form a coating layer on these surfaces, and simultaneously the molecules of lubricant are easily taken apart by a sliding action of the disk and the magnetic head. Since the surface of a perfluoropolyether molecule is almost wholly covered with fluorine atoms, the ether has a good property of being easily sheared between the molecules. However, it lacks a satisfactorily strong adhesive strength to the disk surface or to the magnetic head surface. Introduction of various polar groups into the molecular terminal of perfluoropolyether has been proposed to remedy the above-mentioned defect. However, due to the high molecular weight of several thousands of perfluoropolyether useful in practice, the effect of the introduction of polar groups is not appreciable and the effect of improving the disk durability is not marked. On the other hand, aliphatic hydrocarbons having polar groups typically represented by stearic acid and stearylamine have a high adhesive strength to various surfaces and molecular orientability. However, they exhibit a strong interaction between the molecules as compared with fluorinated hydrocarbons. Hence, when they are used as the lubricant, the intended durability can be hardly obtained. With regard to preventing the adsorption to the magnetic head, however, they show a greatly improved property attributable to the existance of polar groups as compared with perfluoropolyethers. The amino group has a merit of giving a particularly good adhesion strength to carbon-containing protective layers. However, on the other hand, it has a demerit of readily absorbing moisture at high humidities.

Further, it has been revealed that when a layer of a fluorolubricant is directly formed on the carbon-containing protective layer, the CSS durability and the head adsorption property at high temperatures or high humidities are reduced.

The present invention has been made to solve the above-mentioned problems. An object of the present invention is to improve the endurance reliability and the storage reliability of a metal thin layer type magnetic disk or magnetic tape having a carbon-containing protective layer.

SUMMARY OF THE INVENTION

According to the present invention, there is provided a magnetic record medium comprising
(A) a nonmagnetic substrate,
(B) a layer consisting essentially of a ferromagnetic metal on at least one side of the substrate,
(C) a layer containing carbon on the layer of (B),
(D) a layer comprising a primary or secondary organic amine containing at least one substituent having a fluorinated hydrocarbon group at the end of the substituent on the layer of (C), and
(E) a layer comprising at least one lubricant having a partially or fully fluorinated hydrocarbon group on one end of the molecule and a functional group selected from the group consisting of —OH, —SH, —COOH, —COSH and —CONH$_2$ on the other end of the molecule on the layer of (D).

Another aspect of the present invention is to provide a method comprising the steps of (1) forming a layer consisting essentially of a ferromagnetic metal on at least one side of a nonmagnetic substrate, (2) forming a layer containing carbon on the layer formed in the step (1), (3) coating on the surface of the layer formed in the step (2) a primary or secondary organic amine containing at least one substituent having a fluorinated hydrocarbon group at the end of the substituent, (4) heat-treating the layer coated in the step of (3), (5) either washing the heat-treated layer with a solvent or exposing the surface of the layer to a high-temperature vapor of said organic amine, and (6) forming on the layer treated in the step (7) a layer comprising at least one lubricant having a partially or fully fluorinated hydrocarbon group on one end of the molecule and a functional group selected from the group consisting of —OH, —SH, —COOH, —COSH and —CONH$_2$ on the other end of the molecule.

The primary or secondary organic amine containing at least one substituent having a fluorinated hydrocarbon group at the end of the substituent is strongly adsorbed through its amino group to the surface of the carbon-containing protective layer. And the nonpolar, partially or fully fluorinated hydrocarbon moieties are oriented through the intermolecular force, mainly the van der Waals force, between the molecules so as to expose the nonpolar terminals at the surface whereby a low-energy surface is formed. Further thereon, there is present a lubricant having a partially or fully fluorinated hydrocarbon group on one end of the molecule and a functional group selected from the group consisting of —OH, —SH, —COOH, —COSH and —CONH$_2$ on the other end of the molecule. The lubricant contains no hygroscopic amino group but contains a nonpolar terminal part of a chemical structure closely related with the above-defined amine. The nonpolar terminal parts of the lubricant are oriented toward the low-energy surface and forms a sliding plane of low friction. At the same time, the molecules of the lubricant gather in some order so that the intermolecular orientation is improved. The mechanism outlined above would greatly improve the CSS durability of magnetic disks and prevent the head adsorption phenomenon. The mechanism would also improve the durability of magnetic tapes at high humidities.

BRIEF DESCRIPTION OF THE DRAWING

The attached drawing is a diagram showing the basic construction of a magnetic record medium in one embodiment of the present invention.

Numeral 1 indicates a nonmagnetic substrate, 2 a ferromagnetic metal layer, 3 a layer containing carbon, 4 a layer comprising a primary or secondary organic amine containing at least one substituent having a fluorinated hydrocarbon group at the end of the substituent, and 5 a layer comprising at least one lubricant having a partially or fully fluorinated hydrocarbon group on one end of the molecule and a functional group selected from the group consisting of —OH, —SH, —COOH, —COSH and —CONH$_2$ on the other end of the molecule.

DETAILED DESCRIPTION OF THE INVENTION

Figure 1:
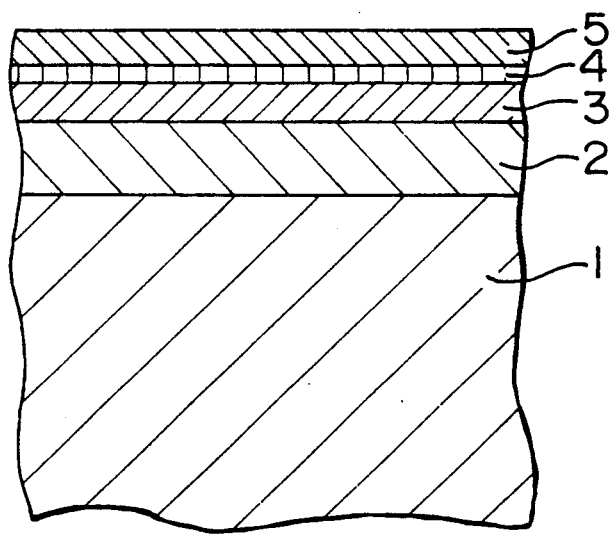

The Drawing is a diagram showing the basic construction of a magnetic record medium in one embodiment of the present invention. In the Drawing, the numeral 1 indicates a nonmagnetic substrate, 2 a ferromagnetic metal layer, 3 a layer containing carbon, 4 a layer comprising a primary or secondary organic amine containing at least one substituent having a fluorinated hydrocarbon group at the end of the substituent (hereinafter the layer comprising the amine), and 5 a layer comprising at least one lubricant having a partially or fully fluorinated hydrocarbon group on one end of the molecule and a functional group selected from the group consisting of —OH, —SH, —COOH, —COSH and —CONH$_2$ on the other end of the molecule (hereinafter the layer comprising the lubricant).

The amine contained in the layer comprising the amine 4 is a primary or secondary amine having a fluorinated hydrocarbon group at the end of the substituent. It is preferably an amine having a fluorinated hydrocarbon group of 1–31 carbon atoms. More preferably, it is an organic compound represented by the following formulas I–V

  (I)

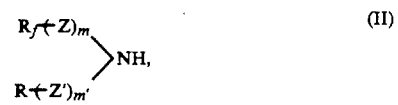  (II)

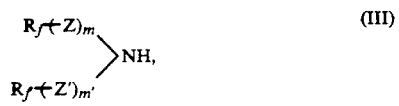  (III)

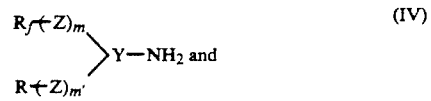  (IV)

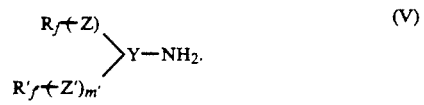  (V)

In the above formulas I–V, $R_f$ and $R_f'$ each independently denote a hydrocarbon group having at the end thereof a fluoroaryl group of 6–21 carbon atoms or a fluoroalkyl or fluoroalkenyl group of 3–31 carbon atoms and optionally containing either a phenylene group or its derivative group of 6–21 carbon atoms, or an aliphatic alkylene group of 1–31 carbon atoms; or denote a fluorinated hydrocarbon-oxy or fluorinated hydrocarbon-thio group wherein the fluorinated hydrocarbon group bonds to the $(Z)_m$ or $(Z')_{m'}$ group through an oxygen or sulfur atom. Specific examples of the fluorinated alkyl group or fluorinated alkenyl group are

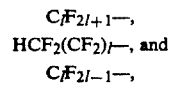

wherein l denotes an integer of 3–31. Specific examples of the fluoroaryl group are

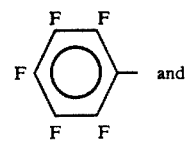 and

-continued

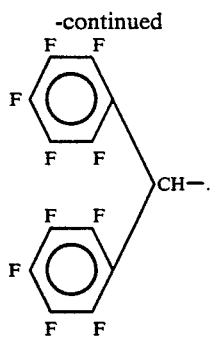

R denotes a hydrocarbon group comprising an aliphatic alkyl or alkenyl group of 8-31 carbon atoms, or a group comprising an aliphatic alkyl or alkenyl group of 8-31 carbon atoms and a phenylene group or its derivative group of 6-21 carbon atoms, and having the aliphatic alkyl or alkenyl group at the tail. Specific examples of the aliphatic alkyl or alkenyl group are $C_pH_{2p+1}-$,
$C_pH_{2p}-$, and
$C_pH_{2p-1}-$, wherein p denotes an integer of 8-31. Specific examples of the hydrocarbon terminal group comprising either the aliphatic alkyl or alkenyl group and the phenylene group or its derivative group and having the aliphatic alkyl or alkenyl group at the tail are

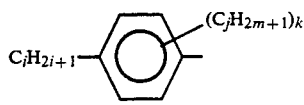

wherein k, j and i denote an integer of 0-4, 1-15 and 8-31, respectively.

$(Z)_m$ and $(Z')_{m'}$ each independently denote a linking group selected from the group consisting of

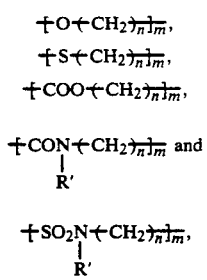

wherein m and m' each independently denote 0 or 1, n denotes 0 or an integer of 1-31, and R' denotes H, CH$_3$ or C$_2$H$_5$. Specific examples thereof are

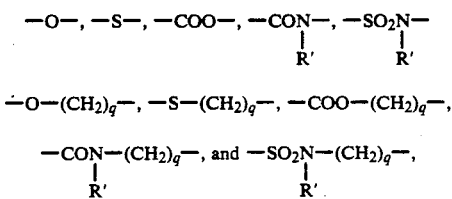

wherein q denotes an integer of 1-31 and R' denotes H, CH$_3$ or C$_2$H$_5$.

Y denotes a linking group selected from the group consisting of

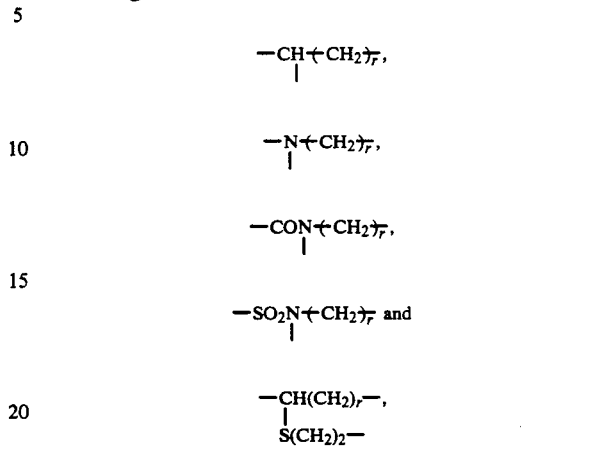

wherein r denotes O or an integer of 1-31.

Although it is preferable to use one of the above-defined organic compounds or the mixture of two or more thereof as the organic amine, other primary or secondary organic amine containing at least one substituent having a fluorinated hydrocarbon group at the end of the substituent may also be used. When an unfluorinated amine is used, the CSS durability and still durability cannot be improved. The organic amine used in the present invention may have plural amino groups in the molecule. In any cases, the amine has preferably a molecular weight per number of amino group of not more than 3,000, more preferably not more than 2,000. When the molecular weight is more than 3,000, the amino group sometimes does not produce satisfactory results. The ratio of the atomic group weight of the fluoroalkyl, fluoroalkenyl or fluoroaryl group to the total molecular weight of the amine is preferably in the range of 10-90%, more preferably 20-80%. When the ratio is less than 10% or more than 90%, the CSS durability and the still durability are sometimes unsatisfactory.

The organic amines used in the present invention are usually applied in the form of an adsorption layer onto the carbon layer.

The layers containing carbon used in the present invention are layers comprising carbon in the form of amorphous carbon, graphite or diamond-like carbon, their mixture or the laminate thereof, obtainable by such methods as sputtering or plasma CVD. The thickness of the layer is preferably 50-500 Å.

The layer of the organic amine may be formed on the layer containing carbon by a method which comprises exposing the carbon layer surface to the organic amine vapor under normal or reduced pressure at a temperature of 60° C. or more, preferably 100° C. or more. Or, it is also possible to apply a method which comprises coating a low-concentration solution of the organic amine (e.g., 0.5% alcoholic solution) on the surface of the layer containing carbon, drying the coated layer, heat-treating the dried layer at a temperature of 60° C. or more, preferably 80° C. or more, over a period of several seconds to several hours, and washing the heat-treated layer surface with a solvent for the organic amine to remove the organic amine remaining unadsorbed in excess. In this case, in order to get satisfactory results, it is preferable to remove the unadsorbed amine as completely as possible. The solvent for the amine is not critical, but is preferably an alcohol, ketone or ester. It is preferable to make the organic amine adsorbed in a sufficiently large amount on the layer containing carbon. From an idealistic viewpoint, it is most preferable that the whole surface of the layer is covered with a compact monomolecular adsorption layer. For this purpose, the surface of the layer containing carbon is preferably subjected to an oxidation treatment prior to the adsorption of the organic amine. The oxidation treatment is suitably performed by exposure of the surface to a gas containing 10% or more of ozone, plasma oxidation in an oxygen atmosphere of reduced pressure, or anode oxidation in an electrolytic solution.

On the organic amine layer described above, is formed the layer comprising the lubricant. The lubricant used has preferably a fluorinated hydrocarbon group of 3-31 carbon atoms. More preferably it is an organic compound represented by the formulas VI--VIII

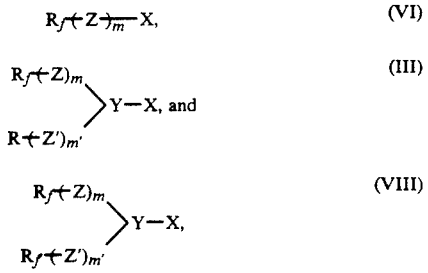

wherein $R_f$ and $R_f'$ denote the same fluorinated hydrocarbon groups as those defined for the formulas I-V; R denotes the same hydrocarbon groups as those defined for the formulas I-V; $(Z)_m$ and $(Z')_m'$ denote the same linking groups as those defined for the formulas I-V; Y denotes the same linking groups as those defined for the formulas I-V; and X denotes a polar end group selected from the group consisting of —OH, —SH, —COOH, —COSH and —CONH$_2$; a mixture of the compound and one or more known lubricants, rust preventives, etc. In the last case, the proportion of the organic compound in the whole lubricant mixture is preferably at least 50%. The proportion less than 50% sometimes produce unsatisfactory results. The organic compound preferably has a molecular weight of 3,000 or less, more preferably 2,000 or less. Using a lubricant having a molecular weight more than 3,000 sometimes produce unsatisfactory results. Further, the ratio of the atomic group weight of the fluoroalkyl, fluoroalkenyl or fluoroaryl group to the total molecular weight of the organic compound is preferably in the range of 10-90%, more preferably 20-80%. When the ratio is less than 10% or more than 90%, the CSS durability and still durability are sometimes unimproved.

Directly forming a layer comprising the lubricant on the layer containing carbon without forming an organic amine layer does not produce satisfactory results in not only the CSS and still durabilities but also the other properties, including the head adsorption property at high temperatures and high humidities.

The layer comprising the lubricant may be formed on the organic amine layer by conventional wet coating methods or dry coating methods such as vapor deposition. The amount of the lubricant adhered is preferably 0.05-300 mg, more preferably 0.1-150 mg, per square meter of the surface.

The ferromagnetic metal layers usable in the present invention include layers of Co-Ni, Co-Ni-Cr, Co-Ni-P, Fe-Co, Fe-Co-Ni, obtainable by vacuum deposition, spattering, ion plating or plating. An underlayer of Cr, Ti or the like may be provided as occasion demands. The thickness of the ferromagnetic metal layer including the underlayer is preferably 500-5000 Å. Between the ferromagnetic metal layer and the layer containing carbon, there may be provided as occasion demands a thin layer of nonmagnetic metal such as Cr and Ti, an organic plasma-polymerized layer, and the like.

Specific examples of the nonmagnetic substrate are those formed of such materials as glass, ceramics, metals such as aluminum alloy and titanium alloy, and plastics such as polyesters, polyimides, polyamideimides, polycarbonates, and polyacrylates. Substrates comprising the above-mentioned substrates as the main body and Co-P plating, polyimide coating film, etc. formed thereon as required may also be used. There may also be provided protrusions in the shape of minute granules, knolls, waves, etc formed by texture-finishing. The shape of the substrate may include, depending upon the intended uses, a disk, sheet, film, card, and drum. The surface roughness of the substrate is preferably 100-600 Å in terms of the maximum height $R_{max}$.

One embodiment of the present invention will be described in detail below wherein the invention was applied to a hard disk.

The nonmagnetic substrate used was obtained by applying a nonmagnetic N-P alloy plating having a thickness of 20 μm on the surface of an Al alloy plate having a diameter of 95 mm and a thickness of 1.2 mm, and forming on the plated surface protrusions having an average roughness of 50 Å and a maximum height of 300 Å by texture-finishing. A Cr underlayer having a thickness of 1300 Å and a Co-Ni ferromagnetic metal layer having a thickness of 600 Å were formed thereon by spattering. A graphite layer having a thickness of 300 Å was formed further thereon by sputtering. The resulting disk is referred to as "sample A". A disk was obtained in the same manner as above except for forming a diamond-like carbon layer having a thickness of 100 Å in place of the graphite layer. The disk is referred to as "sample B." A disk having no carbon-containing layer (Comparative Example) is referred to as "sample C." On these respective samples were formed layers comprising the organic amine of various kinds described above by either the following three methods.

Method L: a 0.1% ethanol solution of an organic amine was coated on a disk sample, and the coating was heat-treated at 100° C. for 1 hour and then washed with ethanol.

Method M: An organic amine was vaporized at 120° C. under normal pressure, and the surface of a disk sample was exposed to the vapor for 1 minute.

Method N: The surface of a disk sample was exposed to an air containing ozone in an ozone concentration of 15% at room temperature for 1 minute so that the surface was compulsorily oxidized. Then an organic amine was adsorbed onto the surface by using the method M.

Thereafter, a prescribed amount of an ethanol or chlorofluorocarbon (CFC) solution containing one or two lubricants in a certain concentration was applied on the layer comprising the above-described amine to give a prescribed layer thickness. The samples thus obtained were subjected to determination of the CSS durability at 40° C. and 80% R.H. and to determination of the head adsorption property after standing at 60° C. and 80% R.H. The CSS durability was classified into the following ratings. The symbol ⊙ indicates the μs was less than 0.4 after 2,000 times. The symbol ◯ indicates the μs falls within the range of 0.4–1.0. And the symbol × indicates the μs was more than 1.0 or the head crash occurred in the course of the test. The adsorption property was examined by the force exerted to the head at the time of starting the disk at room temperature after standing at 60° C. and 80% R.H. for 1 day. The symbol × indicates the force showed an abnormal value and the symbol ◯ indicates the force showed a normal value.

The results of these tests are shown in Table 1 in comparison with the details of the samples. The Example numbers shown in parentheses refer to Comparative Examples.

TABLE 1

Results in application to hard disk

| Example No. (Comp. Example No.) | Sample | Organic amine | Method of forming amine layer | Lubricant | Amount of lubricant coated (mg/m$^2$) | CSS durability | Head adsorption |
|---|---|---|---|---|---|---|---|
| 1 | A | n-$C_8F_{17}(CH_2)_{11}NH_2$ | L | n-$C_8H_{17}CH(CH_2)_8OH$ <br> \| <br> $S-CH_2C_6F_{13}$ | 5 | ◯ | ◯ |
| 2 | A | n-$C_8F_{17}(CH_2)_{11}NH_2$ | L | $C_{12}H_{25}CHCH_2COOC_2H_4$–⟨ring⟩–$OC_9F_{17}$ *1 <br> \| <br> OH | 5 | ◯ | ◯ |
| 3 | A | n-$C_8F_{17}(CH_2)_{11}NH_2$ | M | n-$C_8H_{17}SO_2N(CH_2)_2C_8F_{17}$-n <br> \| <br> $CH_2COOH$ | 5 | ◯ | ◯ |
| 4 | A | n-$C_8F_{17}(CH_2)_2NH_2$ | M | $C_{18}H_{37}CHCOSH$ <br> \| <br> $OC_8F_{17}$-n | 5 | ◯ | ◯ |
| 5 | A | $C_9F_{17}O(CH_2)_6NH_2$ *1 | L | $C_{18}H_{37}$—CHCOOH <br> \| <br> $OC_2H_4N.SO_2C_8F_{17}$-n <br> \| <br> $CH_3$ | 1 | ◯ | ◯ |
| 6 | A | $C_9F_{17}O(CH_2)_6NH_2$ *1 | N | $C_8H_{17}CH(CH_2)_8COOCH_2C_6F_{13}$-n <br> \| <br> SH | 1 | ⊙ | ◯ |
| 7 | A | $C_9F_{17}O$–⟨ring⟩–CH($C_{18}H_{37}$)NH *1 | N | $C_2H_5$ <br> \| <br> n-$C_8H_{17}SO_2NCH_2COOH$ | 5 | ⊙ | ◯ |
| 8 | B | $C_9F_{17}O$–⟨ring⟩–CH($C_{18}H_{37}$)NH *1 | L | $C_9F_{17}O(CH_2)_{20}COOH$ *1 | 10 | ◯ | ◯ |
| 9 | B | n-$C_7F_{15}C_2H_4$–NH–$CH_2$–⟨ring⟩–$OC_9F_{17}$ *1 | N | $C_9F_{17}O$–⟨ring⟩–CON($CH_3$)$(CH_2)_2OH$ *1 | 5 | ⊙ | ◯ |
| 10 | A | n-$C_7F_{15}C_2H_4$–NH–$CH_2$–⟨ring⟩–$OC_9F_{17}$ *1 | L | F,F,F,F-⟨ring⟩–$CH_2CH=CH(CH_2)_{14}COOH$ | 10 | ◯ | ◯ |

TABLE 1-continued

Results in application to hard disk

| Example No. (Comp. Example No.) | Sample | Organic amine | Method of forming amine layer | Lubricant | Amount of lubricant coated (mg/m$^2$) | CSS durability | Head adsorption |
|---|---|---|---|---|---|---|---|
| 11 | A | $C_{10}H_{21}\underset{SC_2H_4COOCH_2C_6F_{13}\text{-}n}{CHCH_2NH_2}$ | L | F$_5$C$_6$H$_4$–CH(–C$_6$H$_4$F$_5$)CH(CH$_2$)$_{15}$CH(CH$_3$)COOH | 1 | ○ | ○ |
| 12 | A | $C_{10}H_{21}\underset{SC_2H_4COOCH_2C_6F_{13}\text{-}n}{CHCH_2NH_2}$ | N | $n\text{-}C_8F_{17}(CH_2)_{10}CONH_2$ | 10 | ⊙ | ○ |
| 13 | A | biphenyl-(CH$_2$)$_3$-N(C$_2$H$_5$)(n-C$_8$F$_{17}$SO$_2$NC$_2$H$_4$)-NH | L | $HCF_2(CF_2)_9(CH_2)_5CONH_2$ | 5 | ○ | ○ |
| 14 | A | biphenyl-(CH$_2$)$_3$-N(C$_2$H$_5$)(n-C$_8$F$_{17}$SO$_2$NC$_2$H$_4$)-NH | L | $n\text{-}C_8F_{17}SO_2N(C_2H_5)CH_2CONH_2$ | 5 | ○ | ○ |
| 15 | A | F$_5$C$_6$H$_4$–CH$_2$–NH–C$_{18}$H$_{37}$ | L | F$_5$C$_6$H$_4$–CH$_2$CH=CH(CH$_2$)$_{14}$CONH$_2$ | 5 | ○ | ○ |
| (16) | C | F$_5$C$_6$H$_4$–CH$_2$–NH–C$_{18}$H$_{37}$ | L | F$_5$C$_6$H$_4$–CH$_2$CH=CH(CH$_2$)$_{14}$CONH$_2$ | 5 | X | X |
| 17 | A | $n\text{-}C_8F_{17}(CH_2)_2NH_2$ | M | *1 $C_9F_{17}O$–C$_6$H$_4$–(CH$_2$)$_6$CONH$_2$ and $n\text{-}C_8F_{17}SO_2N(C_2H_5)CH_2COOH$ Equal weight mixture | 5 | ○ | ○ |
| 18 | B | $n\text{-}C_8F_{17}(CH_2)_2NH_2$ | M | $C_{18}H_{17}\underset{OC_8F_{17}\text{-}n}{-CHCOSH}$ and $n\text{-}C_8F_{17}(CH_2)_{10}CONH_2$ Equal weight mixture | 5 | ○ | ○ |
| (19) | A | $C_8H_{37}NH_2$ | L | $C_8H_{17}\underset{S-CH_2C_6F_{13}\text{-}n}{-CH(CH_2)_8OH}$ | 5 | X | ○ |
| (20) | A | — | — | $C_9F_{17}(CH_2)_{20}COOH$ *1 | 5 | X | X |

TABLE 1-continued

Results in application to hard disk

| Example No. (Comp. Example No.) | Sample | Organic amine | Method of forming amine layer | Lubricant | Amount of lubricant coated (mg/m²) | CSS durability | Head adsorption |
|---|---|---|---|---|---|---|---|
| (21) | A | C₉F₁₇O—⟨C₆H₄⟩—CH(C₁₈H₃₇)NH *1 | L | C₉F₁₇O—⟨C₆H₄⟩—CH(C₁₈H₃₇)NH *1 | 5 | X | ○ |
| (22) | A | n-C₈F₁₇(CH₂)₁₁NH₂ | L | C₁₈H₃₇SH | 10 | X | ○ |
| (23) | A | (C₁₈H₃₇)₂NH | L | C₈H₃₇COOH | 10 | X | ○ |

Note:

*1 $C_9F_{17}$—: 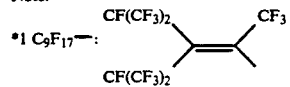

Another embodiment of the present invention wherein the invention was applied to a vapor deposition tape will be described below.

A polyester film having on the surface several granular protrusions with a gentle slope (average height: 70 Å, average diameter: 1 μm) due to silica fine particles incorporated into the film per 100 μm² of the surface, of which relatively large protrusions due to fine particles resulting from the polymerization catalyst residue had been reduced to the lowest possible level was used. A substrate was prepared by forming on the surface of the polyester film $1 \times 10^7$ steep knoll-like protrusions using silica colloid particles having a diameter of 150 Å as nuclei and an ultraviolet ray-curing epoxy resin as a binder. Then, a Co-Ni ferromagnetic metal layer (Ni content: 20%, layer thickness: 1000 Å) was formed on the substrate by means of continuous oblique vapor deposition in the presence of a trace amount of oxygen. A layer containing diamond-like carbon having a thickness of 100 Å was formed further thereon by means of plasma CVD. The resulting product is referred to as "sample D." A sample without a layer containing carbon is referred to as "sample E" (Comparative Example). On these samples were formed the layer comprising the amine by the method L, M or N and then the layer comprising the lubricant by using the method described above. Then, the still life (the point of time at which the output dropped by 5 dB from the initial value being taken as still life) was determined on an 8 mm VTR deck at 40° C. and 80% R.H. A still life of less than 20 minutes was expressed by the symbol ×, 20–100 minutes by ○ and more than 100 minutes by ⊙.

The results of these tests are shown in Table 2.

TABLE 2

Results in application to vapor deposition tape

| Example No. (Comp. Example No.) | Sample | Organic amine | Method of forming amine layer | Lubricant | Amount of lubricant coated (mg/m²) | Still life |
|---|---|---|---|---|---|---|
| 101 | D | n-C₈F₁₇(CH₂)₁₁NH₂ | L | C₈H₁₇CH(CH₂)₈OH \| S—CH₂C₆F₁₃-n | 5 | ○ |
| 102 | D | n-C₈F₁₇(CH₂)₁₁NH₂ | N | C₁₂H₂₅CHCH₂COOC₂H₄—⟨C₆H₄⟩—OC₉F₁₇ \| OH  *1 | 5 | ⊙ |
| 103 | D | n-C₈F₁₇(CH₂)₁₁NH₂ | M | n-C₈H₁₇SO₂N(CH₂)₂C₈F₁₇-n \| CH₂COOH | 10 | ○ |
| 104 | D | n-C₈F₁₇(CH₂)₂NH₂ | M | C₁₈H₃₇CHCOSH \| OC₈F₁₇-n | 1 | ○ |
| 105 | D | C₉F₁₇(CH₂)₆NH₂ *1 | L | C₈H₁₇CH(CH₂)₈COOCH₂C₆F₁₃-n \| SH | 5 | ○ |

TABLE 2-continued

Results in application to vapor deposition tape

| Example No. (Comp. Example No.) | Sample | Organic amine | Method of forming amine layer | Lubricant | Amount of lubricant coated (mg/m²) | Still life |
|---|---|---|---|---|---|---|
| 106 | D | $C_9F_{17}O$-C$_6$H$_4$-CH(NHC$_{18}$H$_{37}$) *1 | L | $C_9F_{17}O$-C$_6$H$_4$-CON(CH$_3$)(CH$_2$)$_2$OH *1 | 5 | ○ |
| 107 | D | $C_9F_{17}O$-C$_6$H$_4$-CH(NH-n-C$_7$F$_{15}$C$_2$H$_4$) *1 | L | F$_5$-C$_6$-CH$_2$CH=CH(CH$_2$)$_{14}$COOH | 5 | ○ |
| 108 | D | C$_{10}$H$_{21}$CH(SC$_2$H$_4$COOCH$_2$C$_6$F$_{13}$-n)CH$_2$NH$_2$ | N | (F$_5$-C$_6$)$_2$CH(CH$_2$)$_{15}$CH(CH$_3$)COOH | 5 | ◉ |
| 109 | D | (C$_6$H$_5$)$_2$-(CH$_2$)$_3$-NH-C$_2$H$_4$-N(C$_2$H$_5$)SO$_2$-n-C$_8$F$_{17}$ | L | n-C$_8$F$_{17}$SO$_2$N(C$_2$H$_5$)CH$_2$CONH$_2$ | 5 | ○ |
| (110) | E | F$_4$-C$_6$H-CH$_2$-NHC$_{18}$H$_{37}$ | L | $C_9F_{17}O$-C$_6$H$_4$-(CH$_2$)$_6$CONH$_2$ *1 | 5 | X |
| 111 | D | n-C$_8$F$_{17}$(CH$_2$)$_2$NH$_2$ | M | Equal weight mixture of $C_9F_{17}O$-C$_6$H$_4$-(CH$_2$)$_6$CONH$_2$ and n-C$_8$F$_{17}$SO$_2$N(C$_2$H$_5$)CH$_2$COOH *1 | 5 | ○ |
| 112 | D | n-C$_8$F$_{17}$(CH$_2$)$_2$NH$_2$ | M | Equal weight mixture of C$_{18}$H$_{37}$-CH(OC$_8$F$_{17}$-n)COSH and n-C$_8$F$_{17}$(CH$_2$)$_{10}$CONH$_2$ | 5 | ○ |
| (113) | D | n-C$_8$F$_{17}$SO$_2$N(C$_2$H$_5$)CH$_2$CONH$_2$ | L | $C_9F_{17}O$-C$_6$H$_4$-CON(CH$_3$)(CH$_2$)$_2$OH *1 | 5 | X |
| (114) | D | C$_8$H$_{17}$-CH(S-CH$_2$C$_6$F$_{13}$-n)(CH$_2$)$_8$OH | L | n-C$_8$F$_{17}$(CH$_2$)$_{11}$NH$_2$ | 5 | X |

TABLE 2-continued

Results in application to vapor deposition tape

| Example No. (Comp. Example No.) | Sample | Organic amine | Method of forming amine layer | Lubricant | Amount of lubricant coated (mg/m²) | Still life |
|---|---|---|---|---|---|---|
| (115) | D | 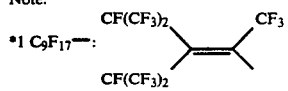 CH₂CH=CH(CH₂)₁₄COOH (with F substituents on phenyl ring) | L | *1 n-C₇F₁₅C₂H₄ / C₉F₁₇O–phenyl–CH₂–NH | 5 | X |

Note:

*1 $C_9F_{17}-$:  
$$\begin{array}{c} CF(CF_3)_2 \\ \phantom{X} \diagdown \\ CF(CF_3)_2 \end{array} \!\!\! = \!\!\! \begin{array}{c} CF_3 \\ \diagup \\ \phantom{X} \end{array}$$

As is clear from Tables 1 and 2, according to the present invention, the CSS property and the still life are excellent even at high temperatures and high humidities and the head adsorption property is also improved.

By contrast, as is clear from the results of Comparative Examples, the intended performances are not obtained when the layer containing carbon is absent [Examples (16) and (110)], when the amine layer is absent [Example (20)], when the layer was formed of a compound other than the amine specified in the present invention [Examples (23), (113), (114) and (115)], when a lubricant other than the lubricant specified in the present invention was used [Examples (22) and (23)], and when the same amine as used in the amine layer was used as a lubricant [Example (21)].

According to the present invention, even when the surface property is improved considerably by decreasing the height of surface protrusions for the purpose of improving the recording density, a magnetic record medium having a good endurance reliability can be obtained without causing deterioration of such performances as the CSS durability, head adsorption and still life at high temperatures and high humidities. Thus, the present invention is of great value in industry.

What is claimed is:

1. A magnetic record medium comprising
   (A) a nonmagnetic substrate,
   (B) a layer consisting essentially of a ferromagnetic metal on at least one side of the substrate,
   (C) a layer consisting essentially of one member selected from the group consisting of amorphous carbon, graphite, diamond-like carbon, mixtures thereof and laminates thereof on the layer of (B),
   (D) a layer comprising a primary or secondary organic amine containing at least one substituent having a fluorinated hydrocarbon group at the non-amine end of the substituent on the layer of (C), and
   (E) a layer consisting essentially of at least one lubricant having a partially or fully fluorinated hydrocarbon group on one end of the molecule and a functional group selected from the group consisting of —OH, —SH, —COOH, —COSH and —CONH₂ on the other end of the molecule on the layer of (D).

2. A magnetic record medium according to claim 1, wherein the organic amine is an organic compound having any of the formula I-V

   (I)

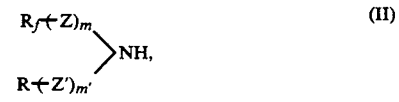   (II)

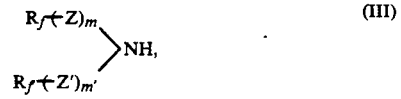   (III)

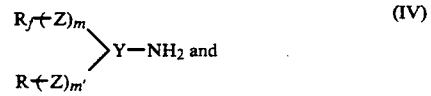   (IV)

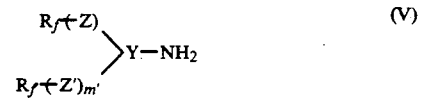   (V)

wherein $R_f$ and $R_f'$ each independently denote a hydrocarbon group having at the end thereof a fluoroaryl group of 1–31 carbon atoms or a fluoroalkyl or fluoroalkenyl group of 3–31 carbon atoms and optionally containing either a phenylene group or its derivative group of 6–21 carbon atoms, or an aliphatic alkylene group of 1–31 carbon atoms, or denote a fluorinated hydrocarbon-oxy or -thio group so that the fluorinated hydrocarbon group bonds to the $(Z)_m$ or $(Z')_m$ group through an oxygen or sulfur atom;

R denotes a hydrocarbon group comprising an aliphatic alkyl or alkenyl group of 8–31 carbon atoms or a hydrocarbon group comprising an aliphatic alkyl or alkenyl group of 8–31 carbon atoms and a phenylene group or its derivative group of 6–21 carbon atoms, and having the aliphatic alkyl or alkenyl group at the tail;

$(Z)_m$ and $(Z')_m$, each independently denote a linking group selected from the group consisting of $-\!\!+\!\!O\!\!+\!\!CH_2\!\!+\!\!_n\!\!+\!\!_m$, $-\!\!+\!\!S\!\!+\!\!CH_2\!\!+\!\!_n\!\!+\!\!_m$, $-\!\!+\!\!COO\!\!+\!\!CH_2\!\!+\!\!_n\!\!+\!\!_m$,

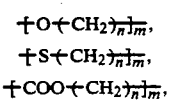 and

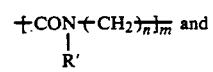

-continued $$\mathrm{+SO_2N+CH_2)_n\mathcal{I}_m},$$
$$\quad\ \ |$$
$$\quad\ \ R'$$

wherein m and m' each independently denote 0 or 1, at least one of m or m' not being zero, n denotes 0 or an integer of 1–31, and R' denotes H, CH$_3$ or C$_2$H$_5$; and Y denotes a linking group selected from the group consisting of $$-\mathrm{CH+CH_2)_r},$$
$$\quad\ |$$

$$-\mathrm{N+CH_2)_r},$$
$$\ |$$

$$-\mathrm{CON+CH_2)_r}\ \text{and}$$
$$\quad\ \ |$$

$$-\mathrm{SO_2N+CH_2)_r},$$
$$\quad\ \ |$$

wherein r denotes 0 or an integer of 1–31.

3. A magnetic record medium according to claim 1, wherein the lubricant comprises at least one organic compound having any of the formulas VI–VIII $$R_f + Z \rightarrow_m X \quad \text{(VI)}$$

$$\begin{array}{c} R_f + Z)_m \\ \phantom{R_f + Z)_m} \diagdown \\ \phantom{R_f + Z)_m} \phantom{\diagdown} Y - X, \text{ and} \\ R + Z')_{m'} \diagup \end{array} \quad \text{(VII)}$$

$$\begin{array}{c} R_f + Z)_m \\ \phantom{R_f + Z)_m} \diagdown \\ \phantom{R_f + Z)_m} \phantom{\diagdown} Y - X, \\ R_f + Z')_{m'} \diagup \end{array} \quad \text{(VIII)}$$

wherein $R_f$ and $R_{f'}$ each independently denote a hydrocarbon group having at the end thereof a fluoroaryl group of 6–21 carbon atoms or a fluoroalkyl or fluoroalkenyl group of 3–31 carbon atoms at the end thereof, and either a phenylene group or its derivative group of 6–21 carbon atoms or an aliphatic alkylene group of 1–31 carbon atoms; or denote a fluorinated hydrocarbon-oxy or -thio group wherein the fluorinated hydrocarbon group bonds to the $(Z)_m$ or $(Z')_{m'}$ group through oxygen or sulfur atom;

R denotes a hydrocarbon group comprising an aliphatic alkyl or alkenyl group of 8–31 carbon atoms, or a group comprising an aliphatic alkyl group of 8–31 carbon atoms and a phenylene group or its derivative group of 6–21 carbon atoms, and having the aliphatic alkyl or alkenyl group at the tail;

$(Z)_m$ and $(Z')_{m'}$ each independently denote a linking group selected from the group consisting of $$+O+CH_2)_n\mathcal{I}_{\overline{m}},$$
$$+S+CH_2)_n\mathcal{I}_{\overline{m}},$$
$$+COO+CH_2)_n\mathcal{I}_{\overline{m}},$$

$$+CON+CH_2)_n\mathcal{I}_{\overline{m}} \text{ and}$$
$$\quad\ \ |$$
$$\quad\ \ R'$$

$$+SO_2N+CH_2)_n\mathcal{I}_{\overline{m}},$$
$$\quad\ \ |$$
$$\quad\ \ R'$$

wherein m and m' each independently denote 0 or 1, at least one of m or m' not being zero, n denotes 0 or an integer of 1–31, and R' denotes H, CH$_3$ or C$_2$H$_5$; and Y denotes a linking group selected from the group consisting of $$-\mathrm{CH+CH_2)_r},$$
$$\quad\ |$$

$$-\mathrm{N+CH_2)_r},$$
$$\ |$$

$$-\mathrm{CON+CH_2)_r},$$
$$\quad\ \ |$$

$$-\mathrm{SO_2N+CH_2)_r} \text{ and}$$
$$\quad\ \ |$$

$$-\mathrm{CH(CH_2)_r-},$$
$$\quad\ |$$
$$\ \ \mathrm{S(CH_2)_2}$$

wherein r denotes 0 or an integer of 1–31; and
X denotes a polar end group selected from the group consisting of —OH, —SH, —COOH, —COSH and —CON$_2$.

* * * * *